Nov. 20, 1962 W. A. GEYGER 3,065,431

FREQUENCY CONTROL CIRCUIT FOR MAGNETIC MULTIVIBRATOR

Filed June 16, 1960 3 Sheets-Sheet 1

INVENTOR.
WILLIAM A. GEYGER

BY W. O. Quesenberry
O. D. Hodges

ATTYS.

INVENTOR.
WILLIAM A. GEYGER
BY W. O. Quesenberry
O. P. Hodges
ATTYS.

INVENTOR.
WILLIAM A. GEYGER
BY W. O. Quesenberry
[signature] Hodges
ATTYS.

United States Patent Office 3,065,431

Patented Nov. 20, 1962

1

3,065,431
FREQUENCY CONTROL CIRCUIT FOR MAGNETIC MULTIVIBRATOR

William A. Geyger, 8510 Flower Ave., Takoma Park, Md.

Filed June 16, 1960, Ser. No. 36,695
8 Claims. (Cl. 331—113)
(Granted under Title 35, U.S. Code (1952), sec. 266)

The invention described herein may be manufactured and used by or for the Government of the United States of America for governmental purposes without the payment of any royalties thereon or therefor.

This invention relates to apparatus for converting a D.C. voltage to a variable frequency A.C. voltage and more particularly to a magnetic multivibrator employing a saturating reactor in the circuit arrangement for controlling the output frequency of the multivibrator.

Static D.C. to A.C. converters employing saturating transformers with rectangular hysteresis loop core materials and switching transistors are finding increasing application as square wave power supplies for magnetic amplifiers, induction motors, gyros, and torque relays. Such converters or magnetic multivibrators are used as D.C. power supply devices where a low voltage direct current is converted into a square wave alternating current transformed into a high voltage level and rectified. They also may be employed as voltage-to-frequency transducers for telemetering as the output frequency is linearly proportional to the D.C. input voltage. It is to be noted, however, that the magnetic multivibrator at present does not serve as a satisfactory power supply for applications where it is necessary to vary the oscillation frequency of the magnetic multivibrator independently without changing the magnitude of the supply voltage.

It was discovered, when observing the operation of a differential type magnetic multivibrator as described by C. H. R. Campling, that the oscillation frequency could be varied within wide limits without changing the magnitude of the output voltage and without impairing the output waveform by connecting a saturating reactor with a rectangular hysteresis loop core material in parallel to the load or across the collector terminals of the switching transistors.

In the differential type magnetic multivibrator, the actual frequency of the square wave output voltage is linearly proportional to the D.C. input voltage. If a transformer with rectangular hysteresis loop core material is used and transistor switching occurs when the core saturates, the oscillation frequency is given by the following equation:

$$f_0=\frac{E_{dc}}{4B_S A_T N_{eff}}\times 10^8$$

where $E_{dc}$ is the D.C. input voltage in volts, $B_S$ is the saturation flux density of the core material in gausses, $A_T$ is the actual cross sectional area, in square centimeters, of the transformer core and $N_{eff}$ is the effective number of turns of the transformer windings.

It is an object of this invention to provide means for changing the output frequency of a magnetic multivibrator without changing the D.C. input voltage.

It is another object of this invention to utilize in a magnetic multivibrator circuit a saturating reactor to provide a variable output frequency.

2

Another object of this invention is to connect a saturating winding having a core of rectangular hysteresis loop material to the circuit arrangement of a magnetic multivibrator to provide variable frequency output voltage.

A further object is to provide a magnetic mutlivibrator with a variable tap saturating winding.

A still further object of this invention is to provide a magnetic multivibrator circuit with a variable tap winding wound on a square loop core material.

Other objects and many of the attendant advantages of this invention will be readily appreciated as the same becomes better understood by reference to the following detailed description when considered in connection with the accompanying drawings in which like reference numerals designate like parts throughout the figures thereof and wherein.

Figure 3:
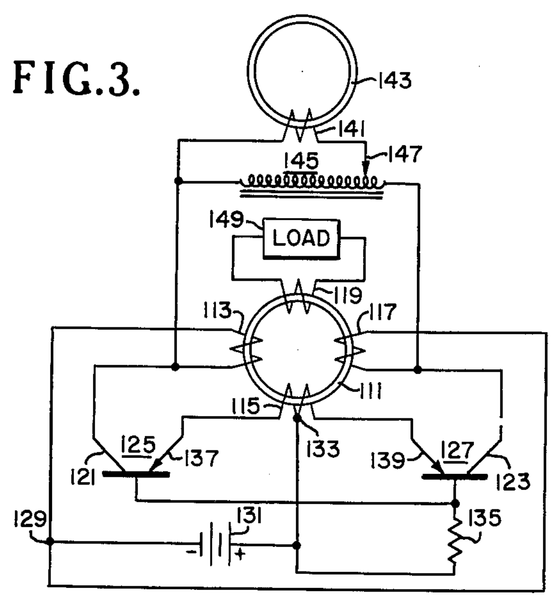
Figure 4:
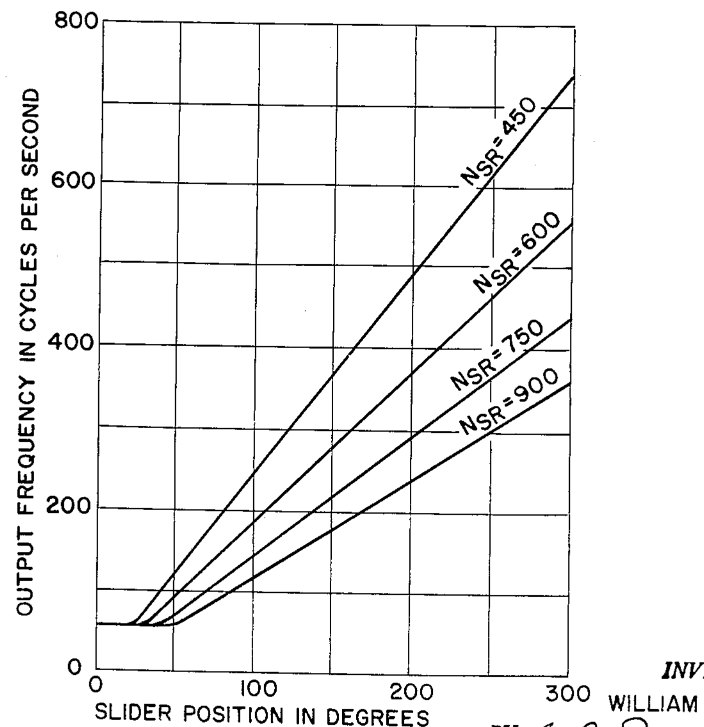
Figure 5:
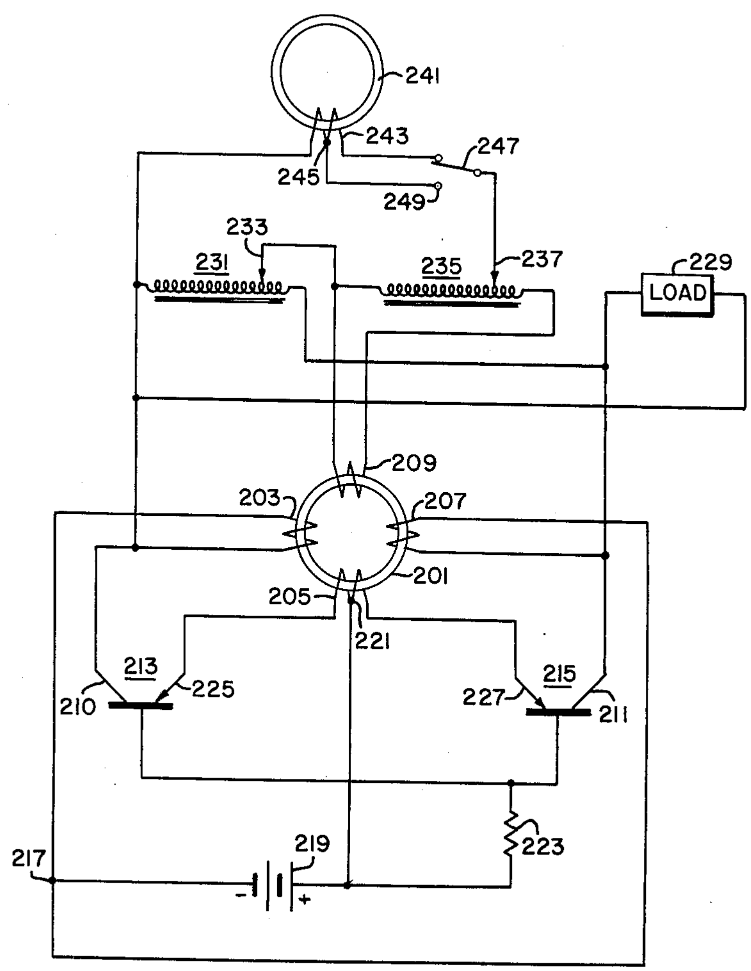

FIG. 3 of the drawings illustrates an embodiment of the invention in which a saturating core winding is employed together with a continuously variable transformer;

FIG. 4 of the drawing is a graph illustrating the relationship of the output frequency and the slider or tap position of the continuously variable transformer; and FIG. 5 illustrates an embodiment of this invention employing a saturating core together with two continuously variable transformers to provide course and fine frequency adjustments.

Figure 1:
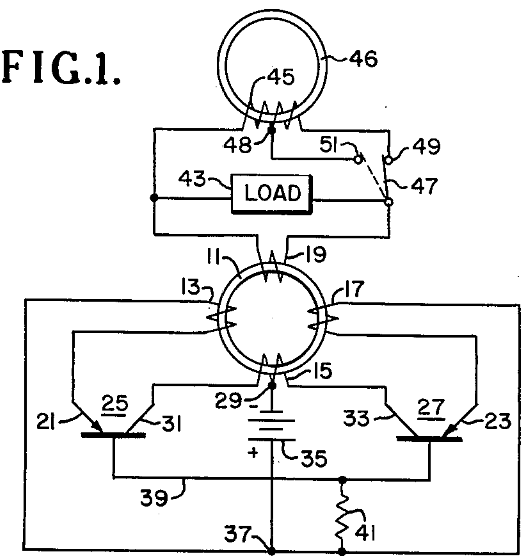
FIG. 1 illustrates an embodiment of this invention in which a variable tap winding is shown connected to the output of a differential magnetic multivibrator.

Referring now to FIG. 1 of the drawings, transformer core 11 is supplied wtih windings 13, 15, 17 and 19. Windings 13 and 17 connect to the emitters 21 and 23 of transistors 25 and 27 respectively. Winding 15 having a center tap 29 connects to collectors 31 and 33 of transistors 25 and 27 respectively, a D.C. voltage supply source 35 between center tap 29 and junction 37 connecting windings 13 and 17. Conductor 39 connects the bases of transistors 25 and 27 together. A bias resistor 41 connects between conductor 39 and junction 37. The load winding 19 of core 11 connects to load 43 and saturating winding 45 through siwtch 47. Winding 45 is wound on core 46. Switch 47 may be connected to terminal 49 as indicated or to terminal 51 leading to a tap 48 on winding 45. Several taps may be added to winding 45 if desired.

For the operation of the circuits of this invention reference is made to the operation of conventional or known magnetic multivibrators. Magnetic multivibrator operation is analogous to the free running capacitor coupled multivibrator. In such a circuit the time interval for cut-off or conduction depends upon the time it takes to charge a capacitor. In the magnetic coupled multivibrator the time interval of the conduction and cut-off periods is determined by the time needed for the magnetic core to change from positive to negative saturation or from negative to positive saturation. In the modification presented by this invention as embodied by FIG. 1 of the drawings, the transformer core does not saturate but the saturating core does saturate and the switching time or conduction and cut-off time of the multivibrators is controlled by the saturating core.

Figure 2:
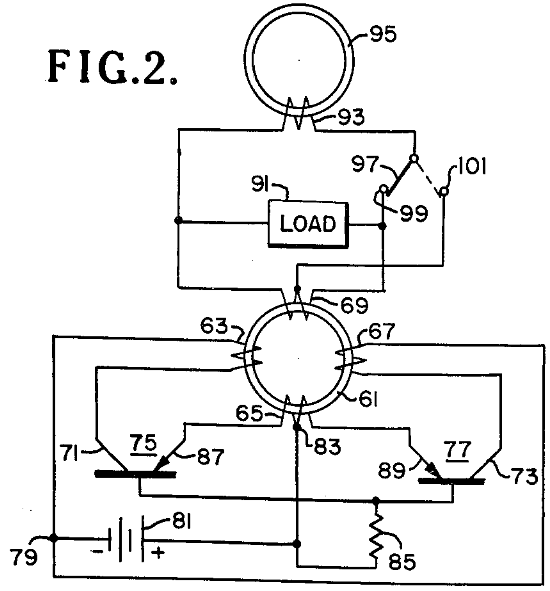
FIG. 2 illustrates an embodiment of this invention in which secondary winding of the transformer is provided with a tap and switching arrangement for changing the output frequency of a multivibrator.

Referring now to FIG. 2 of the drawings, a variation of the invention is disclosed in which the number of turns in the secondary winding of the transformer core may be changed to vary the output frequency. Core 61 is provided with windings 63, 65, 67 and winding 69. Windings 63 and 67 connect to the collectors of transistors 75 and 77 respectively and to a common juncture 79. A D.C. voltage source 81 connects between common juncture 79 and center tap 83 of winding 65. Source 81 also connects to the bases of transistors 75 and 77 through bias resistor 85. Winding 65 is connected at one end to emitter 87 and at the other end to emitter 89. Winding 69 is connected to load 91 and saturating winding 93 which is wound on core 95. A switch 97 with contacts 99 and 101 provides for tapping winding 69. One tap is shown, however, as many taps as are desired may be added.

Referring now to FIG. 3 of the drawings, another embodiment of the invention is illustrated in which the winding of the saturating reactor is connected to a continuously variable transformer. In this embodiment saturable core 111 is provided with windings 113, 115, 117 and winding 119. Windings 113 and 117 connected to collectors 121 and 123 of transistors 125 and 127 respectively. Windings 113 and 117 are connected together at common juncture 129. A D.C. voltage source 131 connects between common juncture 129 and center tap 133 of winding 115. Source 131 also connects to the bases of transistors 125 and 127 through bias resistor 135. Emitters 137 and 139 of transistors 125 and 127 respectively are connected to winding 115. A saturating reactor has saturating winding 141 wound on core 143 connects across continuously variable transformer 145 having tap 147. Load 149 is connected to output winding 119.

Referring now to FIG. 4 of the drawings, the relationship of the output frequency as a function of the slider or tap position of variable transformer 145 is illustrated for the multivibrator circuit of FIG. 3. $N_{SR}$ is the number of turns of winding 141 saturating reactor of FIG. 3. The number of turns $N_{SR}$ of winding 141 of the saturating reactor is a parameter.

Referring now to FIG. 5 of the drawings, a magnetic multivibrator is illustrated in which provision is made for coarse and fine frequency adjustments. In this embodiment, two continuously variable transformers are employed, one connected to the output winding of the magnetic multivibrator and the other connected to the collector terminals of the transistors. Provision is also made for tapping the saturating winding. Transformer core 201 is provided with windings 203, 205, 207 and winding 209, windings 203 and 207 connect to collectors 210 and 211 of transistors 213 and 215 respectively and to common juncture 217. A D.C. voltage source 219 connects between common juncture 217 and center tap 221 of winding 205. The D.C. voltage source 219 also connects to the bases of transistors 213 and 215 through bias resistor 223. Winding 205 connects to emitters 225 and 227 of transistors 213 and 215 respectively. Load 229 is connected across collector terminals 210 and 211. A first continuously variable transformer 231, having a sliding tap 233, is also connected across collector terminals 210 and 211. A second continuously variable transformer 235, having a sliding tap 237, is connected across secondary winding 209. A saturating reactor having core 241 and winding 243 is connected across continuously variable transformers 231 and 235. Winding 243 is shown as having a tap 245, and a switch 247 is employed to connect sliding tap 237 of transformer 235 to terminal 243 connected to one end of winding 243 or to terminal 249 connected to tap 245 of winding 243. This switch and tap provide additional range of frequency control of the multivibrator. Continuously variable transformers 231 and 235 are connected together through sliding tap 233.

Since the fundamental of operation of this apparatus for wide range frequency control resides in loading the circuit by means of a saturating reactor having a rectangular hysteresis loop characteristic, this reactor should have a minimum of copper resistance of the windings. It therefore may be desirable to provide a reactor having several groups of equally rated and preferably bifilar wound windings which may be used either in series or parallel connection to facilitate a step-by-step output frequency variation over a wide range of frequencies.

Magnetic leakage may be eliminated by twisting the wires of the windings together and wrapping them simultaneously around the core of the transformer.

Although the transformer core is always unsaturated at higher frequencies, it may operate at the lowest frequency between negative and positive saturation levels in accordance with the mode of operation of the conventional multivibrator transformer core. It may be desirable, therefore, to employ a rectangular hysteresis loop material in the transformer core if the apparatus is to be operated in the lowest frequency range. However if the multivibrator is to be operated only in the upper part of the frequency range, lower grade core materials may be used for the transformer core.

The continuously adjustable transformers used will never be saturated and commercially available components may be used. In order to minimize the magnetizing current requirements, however, it is preferable to use a standard low power design.

With the use of continuously adjustable transformers the output frequency can be made directly proportional to the angular position of the slider shaft. This arrangement is advantageous in telemetering transducer applications where angular or linear displacement can be converted to a corresponding frequency shift.

In an embodiment of this invention, the transformer was made from an Orthonol 2-mil tape core having an inside diameter of 1.5 inches, an outside diameter of 2.5 inches and a tape width of 1 inch. The windings on the core were made from 275 turns of 6 strands of No. 24 gage wire twisted together and connected so that $N_1$ (windings 13 or 17 of FIG. 1) has 275 turns and $N_2$ (½ of winding 15 of FIG. 1 that is between points 29 and 31 or points 29 and 33) has 550 turns. The saturating reactor may be made from an Orthonol 2 mil tape core having an inside diameter of 1¼ inches, an outside diameter of 1⅝ inches and a tape width of 0.5 inch. The core may be wound with 150 turns of 6 No. 24 gage wires twisted together which may be connected in series, in parallel, or in any desired arrangement. Germanium PNP transistors, type 2N158 may be used in this circuit. The common base resistor which serves to limit the base-to-emitter drive does not have a critical value, but may be 1000 ohms.

In accordance with common transformer techniques higher frequency applications will require thinner tapes and smaller cores. The frequency range of this invention includes power supply frequencies such as 10 cycles up to frequencies of 100,000 cycles.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States:

1. A magnetic multivibrator circuit comprising a first transistor having an emitter, a collector and a base, a second transistor having an emitter, a collector, and a base, a first saturable core having a first winding, a second winding, a third winding and a fourth winding, said first winding being connected to the emitter of said first transistor and to a common connection, said second winding being connected to the collector of said first transistor and to the collector of said second transistor, said third winding being connected to said common connection and to the emitter of said second transistor, the bases of said first and second transistors being connected together, a bias resistor connected between the bases of said transistors and said common connection, a center tap on said second winding, a D.C. input voltage source adapted to be connected across said common connection and said center tap whereby said multivibrator may be energized, a load connected across said fourth winding to receive the output of said multivibrator, a saturating winding wound on a second core, said second core having a rectangular hysteresis loop characteristic, tapping means for selectively adjusting the effective turns of sad saturating winding, said saturating winding being connected across said load whereby a variation in the number of turns of said saturating winding connecting across said load will vary the output frequency of said multivibrator.

2. In a magnetic multivibrator circuit having an output circuit capable of producing a square wave voltage, a saturating winding wound on a saturable core and connected to said output circuit, said core having a rectangular hysteresis loop characteristic, said winding having tapping means for selectively connecting a desired number of turns to said output circuit whereby the output of said multivibrator circuit may be varied.

3. A magnetic multivibrator having an output winding on a first core adapted to produce a square wave output voltage, load means connected across said output winding, saturating winding means wound on a second core, said second core having rectangular hysteresis loop characteristics, means adjusting the effective turns of said saturating winding whereby the frequency of said output voltage may be varied.

4. A magnetic multivibrator comprising a saturable core, a D.C. voltage source, primary winding means on said core, secondary winding means on said core, switching means connecting said primary winding means to said D.C. source alternately in opposite polarities such that said core is alternately saturated in opposite magnetic directions whereby a square wave voltage is produced across said secondary winding, load means connected across said secondary winding means, a saturating winding wound on a second core, said second core having rectangular hysteresis loop characteristics, means to vary the effective number of turns of said saturating winding, means connecting said saturating winding across said load means whereby the frequency of the square wave output voltage may be varied by varying the number of effective turns on the saturating winding.

5. A magnetic multivibrator comprising a saturable core, a first winding on said core, a second winding on said core, a third winding on said core, a fourth winding on said core, said second winding having a center tap, said fourth winding having output terminals, a first transistor having a collector, an emitter, and a base, a second transistor having a collector, an emitter, and a base, means connecting one end of said first winding to the emitter of said first transistor, means connecting one end of said third winding to the emitter terminal of said second transistor, means connecting the other ends of said first and third windings to a common juncture, means connecting one end of said second winding to the collector of said first transistor, means connecting the other end of said second winding to the collector terminal of said second transistor, means connecting the base of said first transistor onto the base of said second transistor, resistor means connected between the bases of said first and second transistors and the common juncture between said first and third windings, said common juncture and said center tap of said second winding adapted to be connected to a source of D.C. voltage, whereby said multivibrator may be energized to produce a square wave output voltage across the output terminals of said fourth winding, load means connected across the output terminals of said fourth winding, a saturating winding wound on a core means, said core means having rectangular hysteresis loop characteristics, means varying the effective turns of said saturating winding, means connecting said winding to the output terminals of said fourth winding whereby the frequency of the square wave output voltage of said multivibrator may be varied by varying the effective number of turns of said saturating winding.

6. A magnetic multivibrator comprising a saturable core, a first winding on said core, a second winding on said core, a third winding on said core, a fourth winding on said core, said second winding having a center tap, said fourth winding having output terminals, a first transistor having a collector, an emitter, and a base, a second transistor having a collector, an emitter, and a base, means connecting one end of said first winding to the emitter of said first transistor, means connecting one end of said third winding to the emitter terminal of said second transistor, means connecting the other ends of said first and third windings to a common juncture, means connecting one end of said second winding to the collector of said first transistor, means connecting the other end of said second winding to the collector terminal of said second transistor, means connecting the base of said first transistor onto the base of said second transistor, resistor means connected between the bases of said first and second transistors and the common juncture between said first and third windings, said common juncture and said center tap of said second winding adapted to be connected to a source of D.C. voltage, whereby said multivibrator may be energized to produce a square wave output voltage across the output terminals of said fourth winding, load means connected across the output terminals of said fourth winding, a saturating winding wound on a core means, said core means having rectangular hysteresis loop characteristics, means connecting said saturating winding to the collector terminals of said first and second transistors, means comprising a variable transformer having a slider tap, said transformer connected across said saturating winding whereby the output frequency may be continuously varied by movement of said slider tap.

7. A magnetic multivibrator having an output circuit adapted to produce a square wave output voltage, load means connected to said output circuit, a saturable reactor connected to said output circuit said saturable reactor including a saturable core having a rectangular hysteresis loop characteristic and a saturating winding, means for varying the effective turns of said saturating winding whereby the frequency of said multivibrator may be varied.

8. A magnetic multivibrator with frequency controlling means comprising a first transistor including a collector, an emitter and a base, a second transistor including a collector, an emitter and a base, a source of D. C. voltage, a bias resistor, a first saturable core, a first winding on said first core, a second winding on said first core said second winding having a center tap, a third winding on said first core, a fourth winding on said first core, said first winding connected to the collector of said first transistor and to a common juncture, said second winding connected to the emitter terminal of said first transistor, and to the emitter terminal of said second transistor, said third winding connected to said common juncture and to the collector of said second transistor, said base of said first transistor connected to the base of said second transistor, said bias resistor connected to the bases of said first and second transistors and to the center tap of said second winding, said source of D.C. voltage adapted to be connected to said common juncture and to the center tap of said second winding, whereby said multivibrator may be energized and a square wave output voltage may be produced, an output circuit including the collectors of said first and second transistors and the fourth winding on said first core, load means connected to said collectors, a first transformer having a winding and a slider tap thereon, a second transformer having a winding and a slider tap thereon, said winding of said first transformer connected across said collectors, said second winding of said second transformer connected to said fourth winding of said first core, said slider tap of said first transformer connected to the winding of said second transformer, a second saturable core with a saturating winding thereon, said saturating winding having a center tap, a switch, said saturating winding connected to the collector of said first transistor and through said switch to said tap of said second transformer, said switch adapted to be connected to the center tap or to the end of said saturating winding whereby the frequency of said output voltage may be varied, said slider taps of said first and second transformers being movable to continuously vary the frequency of said output voltage.

References Cited in the file of this patent

UNITED STATES PATENTS

| | | |
|---|---|---|
| 2,854,580 | Uchrin et al. | Sept. 30, 1958 |
| 2,905,906 | Kittl | Sept. 22, 1959 |

OTHER REFERENCES

Article by C. H. R. Campling in Electronics, March 14, 1958, pages 158 to 161.